United States Patent [19]

Scott

[11] 4,219,915
[45] Sep. 2, 1980

[54] ABRADING TOOL BLADES AND METHOD OF MAKING SAME

[75] Inventor: David B. Scott, Sheffield, England

[73] Assignee: Stanley Tools Limited, United Kingdom

[21] Appl. No.: 24,684

[22] Filed: Mar. 28, 1979

[30] Foreign Application Priority Data

Mar. 31, 1978 [GB] United Kingdom ............... 12639/78

[51] Int. Cl.³ .................... B23D 71/00; B23D 73/04; B21K 21/00
[52] U.S. Cl. ........................................ 29/78; 76/24 R; 76/101 SM
[58] Field of Search .................... 29/78, 80; 76/24 R, 76/101 A, 101 SM

[56] References Cited

U.S. PATENT DOCUMENTS

| | | | |
|---|---|---|---|
| 289,104 | 11/1883 | How | 29/78 |
| 643,717 | 2/1900 | Ingalsbe | 29/78 |
| 1,317,615 | 9/1919 | Cordell | 29/78 |
| 2,976,747 | 3/1961 | Schatzschock et al. | 76/101 SM |
| 3,174,363 | 3/1965 | Staiger et al. | 76/24 R |
| 3,180,005 | 4/1965 | Oxford | 29/78 |
| 3,887,973 | 6/1975 | Coon | 29/78 |

*Primary Examiner*—Harrison L. Hinson
*Attorney, Agent, or Firm*—Prutzman, Kalb, Chilton & Alix

[57] ABSTRACT

An elongate substantially rectangular abrading tool blade, which can be used either for smoothing or for heavy stock removal, is formed of sheet metal and has a multiplicity of ground and hardened cutting teeth distributed over a cutting face of the blade and a multiplicity of associated through-the-blade apertures. The cutting teeth and associated apertures extend in several parallel rows across the blade at an angle other than perpendicular to the longitudinal axis of the blade, with several cutting teeth and associated apertures in each row, all the said cutting teeth facing the same way, namely, perpendicular to the said rows. Each said aperture is directly in front of and adjacent its associated cutting tooth relative to the direction in which the teeth face. Two longitudinal side edge portions of the blade are bent back through an acute angle relative to the cutting face from a longitudinal, substantially flat, middle portion of the blade. The rows of cutting teeth and apertures extend across the full width of the middle portion of the blade and at least to the boundaries of said middle portion with the side edge portions, terminating short of both outside edges of the blade. One of said longitudinal side edge portions comprises edge teeth, which are not ground. The other one of said longitudinal side edge portions is smooth, devoid of edge teeth. The method of making the blade involves the bending back of said longitudinal side edge portions prior to hardening by heat of the blade. The bending back of said longitudinal side edge portions is effected by means of a pair of dies caused to close together and also at the same time to cut the blade from coil.

6 Claims, 13 Drawing Figures

ABRADING TOOL BLADES AND METHOD OF MAKING SAME

BACKGROUND OF THE INVENTION

1. Field of the Invention

This invention relates to abrading tool blades, more particularly, elongate substantially rectangular abrading tool blades formed of sheet metal of a type having a multiplicity of cutting teeth distributed over a cutting face of the blade and multiplicity of associated through-the-blade apertures.

2. Description of the Prior Art

In the normal use of flat abrading tool blades, such as those sold under the Registered Trade Mark "SURFORM", there are many teeth in contact with the work at any instant. The downward and horizontal loads which would be necessary to make each one of these many teeth individually remove maximum amount of material, would be well beyond achievable human values and blade/tool body strengths. As a result, the general cutting effect of flat blades is one of smoothing and flattening rather than heavy stock removal.

To achieve heavy stock removal, i.e., reduce the number of teeth in contact with the work at any time, blades are made with either transversely or longitudinally convex cutting surfaces. These blades are, however, relatively poor at producing smooth or flattened work.

One way of increasing the stock removal rate of a flat blade, is to lift the blade's leading edge, thus concentrating tooth contact with the work towards a longitudinal band of a few teeth along the trailing blade edge.

However, due to the presence of a non-cutting area along this trailing edge, although stock removal is improved the improvement is not optimised.

Another known way of improving (in this case optimising) stock removal of flat blades, is to extend the cutting teeth across the full width of the blade (i.e. eliminating the non-cutting area), thus allowing, in tilted blade mode, maximum tooth penetration. Blades of this type, however, are notoriously difficult to produce, structurally weak and hazardous in use.

SUMMARY.

It is an object of this invention to form the edges of a general flat blade with at least one non-cutting edge in such a way as to optimise stock removal in the tilted blade mode yet retain the smoothing and flattening performance in the flat blade mode.

As seen from a first aspect of the invention, there is provided an elongate substantially rectangular abrading tool blade formed of sheet metal and having a multiplicity of cutting teeth distributed over a cutting face of the blade and a multiplicity of associated through-the-blade apertures, the cutting teeth and associated apertures extending in several parallel rows across the blade at an angle other than perpendicular to the longitudinal axis of the blade, with several cutting teeth and associated apertures in each row, all the said cutting teeth facing in a common single direction which is perpendicular to the said rows, each said aperture being directly in front of and adjacent its associated cutting tooth relative to said common single direction, two longitudinal side edge portions of the blade being bent back through an acute angle relative to the cutting face from a longitudinal, substantially flat, middle portion of the blade, the rows of cutting teeth and apertures extending across the full width of the middle portion of the blade and at least to the boundaries of said middle portion with the side edge portions, terminating short of both outside edges of the blade.

One or both of said longitudinal said side edge portions may comprise edge teeth.

As seen from a second aspect of the invention, there is provided a method of making of tool blade according to the first aspect of the invention, wherein the bending back of said longitudinal side edge portions precedes hardening by heat of the blade.

Preferably, the bending back of said longitudinal side edge portions is effected by means of a pair of dies caused to close together and also at the same time to cut the blade from coil.

DESCRIPTION OF THE PREFERRED EMBODIMENT

Figure 1:
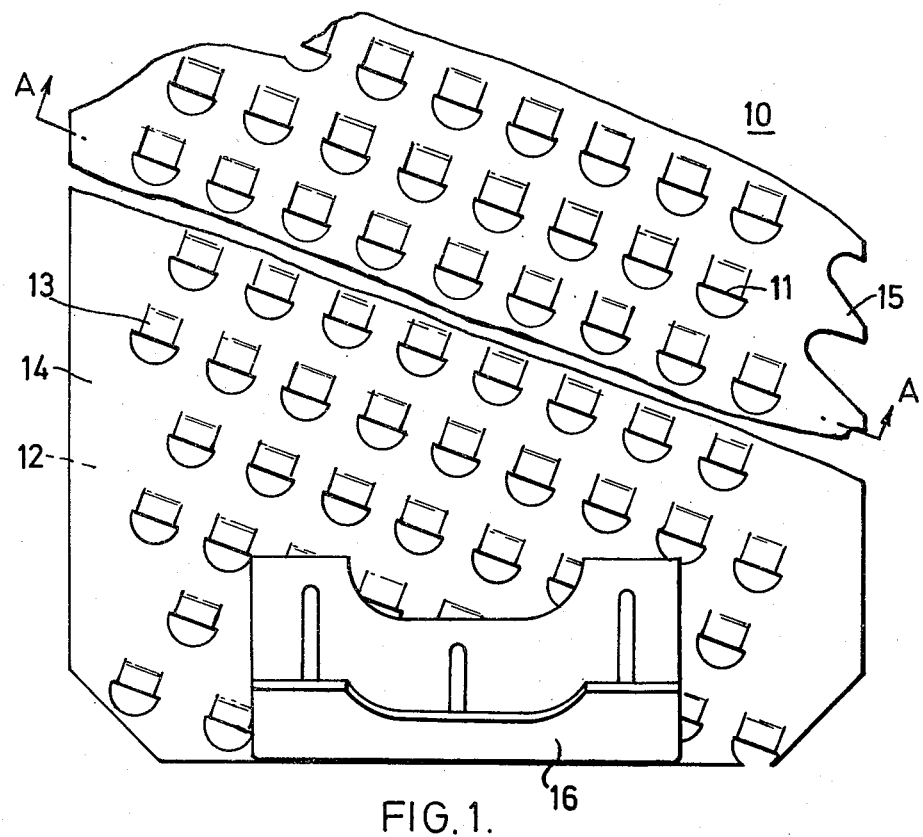
FIG. 1 is a plan view of part of a tool blade of the type to which the invention relates.

Referring to the drawings, the blade 10 of FIG. 1 is an elongate rectangular abrading tool blade of sheet metal having a multiplicity of ground and hardened cutting teeth 11 distributed over a cutting face 12 which is the opposite face to that which can be seen in FIG. 1. The blade 10 also has a multiplicity of associated through-the-blade apertures 13. The cutting teeth 11 and associated apertures 13 extend in several parallel rows across the blade 10 at an angle other than perpendicular to the longitudinal axis of the blade 10, with several cutting teeth 11 face a common single direction, i.e. they all face the same way, which is perpendicular to the rows and generally downwardly as seen in FIG. 1. Each aperture 13 is directly in front of and adjacent its associated cutting teeth, relative to the direction in which the cutting tooth faces, as shown in FIG. 1.

Figure 2:
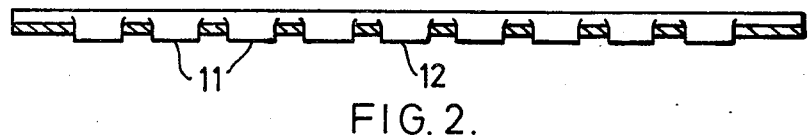
FIG. 2 is a section of line A—A of FIG. 1.

The blade as shown in FIG. 2 is substantially flat over the whole of its width, apart from the formation of the cutting teeth, which necessarily require the cutting face to be not completely flat.

A left-hand longitudinal side edge portion 14 of the blade is smooth, whilst a right-hand longitudinal side edge portion 15 is provided with edge teeth (not ground, unlike cutting teeth 11) as shown in FIG. 1. At each end of the blade there is a respective bracket 16, by means of which the blade 10 can be mounted upon a suitable holder, not shown, in known manner.

Figure 3:
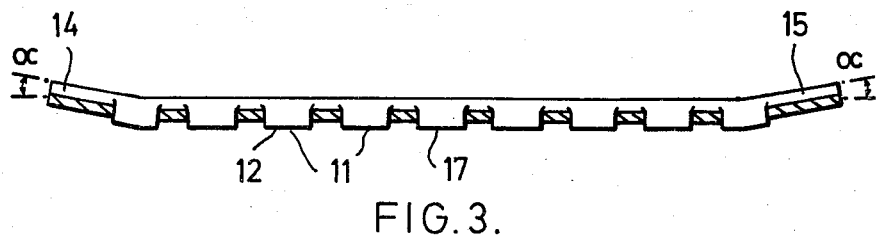
FIG. 3 is a similar section to that of FIG. 2 but showing the blade with the two longitudinal side edge portions of the blade at both sides of the blade bent back relative to the cutting face from a longitudinal, substantially flat, middle portion of the blade, in accordance with the invention.
Figure 4:
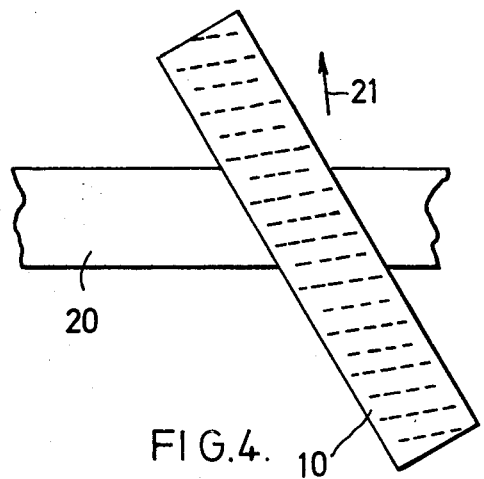
FIG. 4 illustrates an abrading tool blade being used for filing a workpiece.

In accordance with the invention, as shown in FIG. 3, the two longitudinal side edge portion 14 and 15 of the blade 10 at both sides of the blade 10 are bent back through an acute angle (=8° to 20°, preferably 10°) as shown relative to the cutting face 12 from a longitudinal, substantially flat, middle portion 17 of the blade 10.

Although the dimensions and geometry of the bent back longitudinal side edge portions (of dihedrals) are believed not to be critical from a functional point of view, they are dependent upon assembly requirements dictated by the shape of the holder (not shown) with which the blade 10 is adapted to be used. Another consideration is that it is obviously preferred to make the substantially flat middle portion 17 of the blade 10 as wide as possible. The side edge portions 14 and 15 are bent back only a few degrees, as shown in the drawings. The rows of cutting teeth 11 and apertures extend across the full width of the flat middle portion 17 of the blade 10 and at least to the boundaries of the middle portion 17 with the side edge portions 14 and 15, terminating short of both outside edges of the blade 10.

Figure 5:
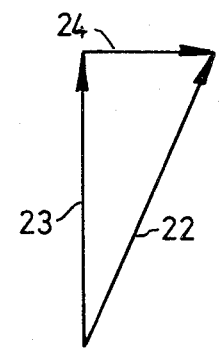
FIG. 5 is a diagram illustrating longitudinal and lateral components of motion of the blade of FIG. 4.

Referring to FIGS. 4, 5, 6 and 7 when the blade 10 is used for filing a workpiece 20, the blade 10 may be moved in the direction of the arrow 21, so that, referring to FIG. 5, its direction of movement relative to workpiece 20, illustrated by arrow 22, includes a longitudinal component 23 (longitudinally of the blade) and a lateral component 24 (laterally of the blade).

Figure 6:
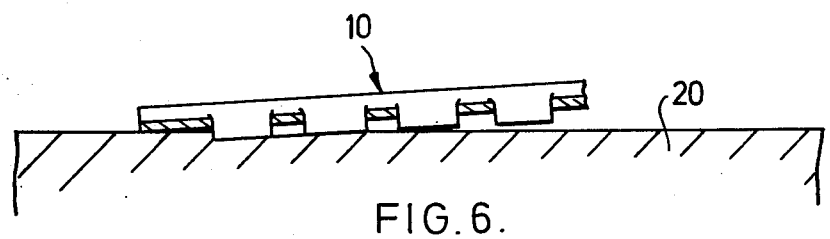
FIG. 6 is a sectional view illustrating filing of a workpiece by means of the tool blade of FIG. 2, that is, not in accordance with the invention.
Figure 7:
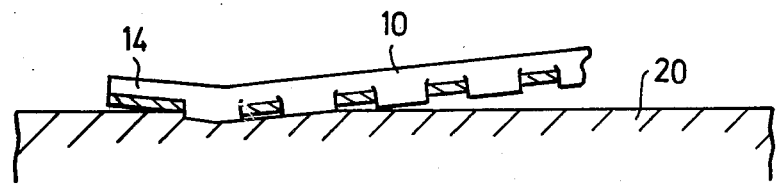
FIG. 7 illustrates filing with the blade of FIG. 3, in accordance with the invention.
Figure 9:
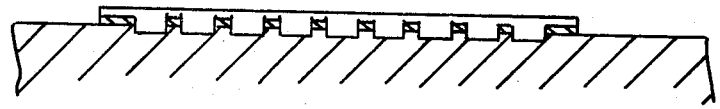
FIG. 9 is a sectional view illustrating the planing effect of the blade of FIG. 2 (not in accordance with the invention)

Comparing FIGS. 6 and 7, it will be appreciated that when used particularly in the filing mode, the additional clearance provided by the bending back of the non-cutting edge portion 14 of the blade 10 of FIGS. 3 and 7 permits greater penetration of the blade 10 in the workpiece 20 than is possible with the blade shown in FIGS. 2 and 9. Although the non-cutting edge portion 14 of blade 10 shown in FIG. 7 continues to limit the maximum penetration, the increased value of this penetration permits a significant increase in material removal per filing stroke without causing the blade to jam, which effect would be induced if no non-cutting edge 14 portion were present, i.e., teeth 11 were to extend across the full width of the blade 10.

It should be noted that this increase in material removal rate is accessed by slight lifting of the leading edge of the blade away from the surface of workpiece 20 which action limits the number of teeth instantaneously in contact thus allowing a controlled maximum depth of cut per tooth to be taken.

Figure 8:
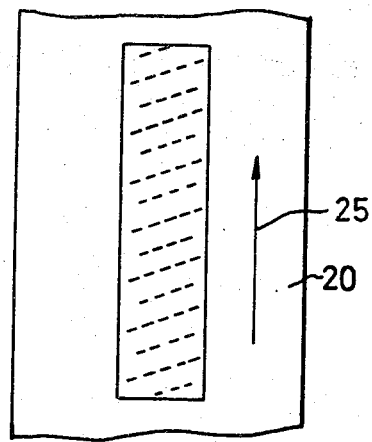
FIG. 8 shows the blade being used for planing.
Figure 10:
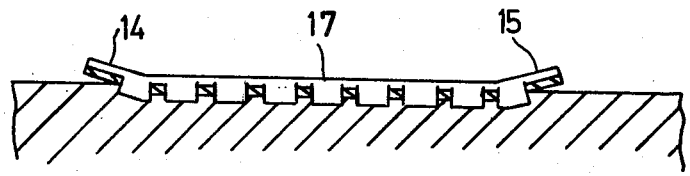
FIG. 10 corresponds to FIG. 9 but illustrates planing with the blade of FIG. 3, in accordance with the invention.

Referring to FIGS. 8, 9 and 10, when the blade 10 is used for planing, it is moved in the direction shown by arrow 25 longitudinally of itself relative to the workpiece 20, so that there is no lateral component corresponding to the lateral component 24 of FIG. 5. In the mode of use illustrated in FIGS. 8, 9 and 10, the additional stock removal per stroke of the blade of FIGS. 3 and 10 is greater than with the unmodified blade of FIGS. 2 and 9.

Figure 11:
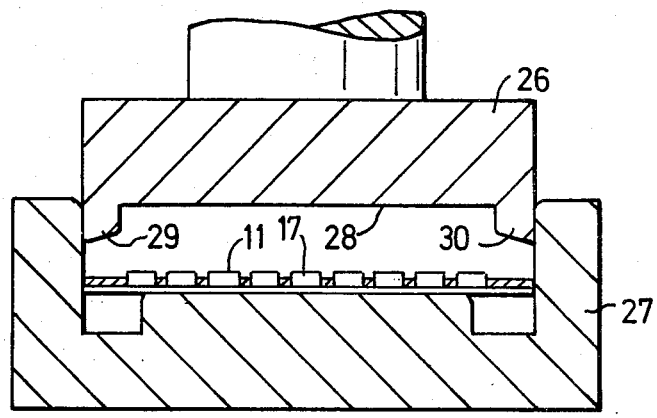
FIGS. 11, 12, and 13 illustrate three succesive steps in forming the blade of FIG. 3 by means of two dies.
Figure 12:
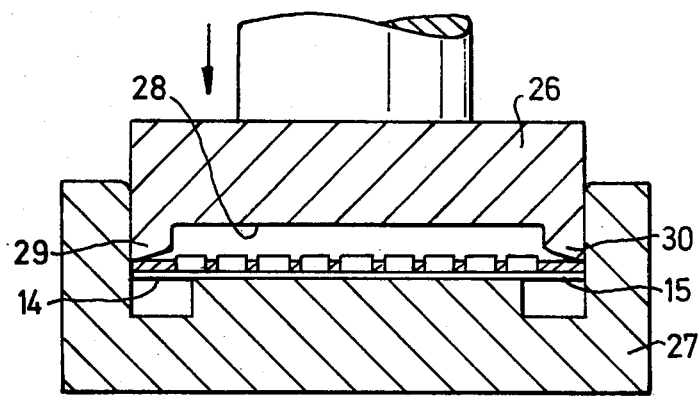
Figure 13:
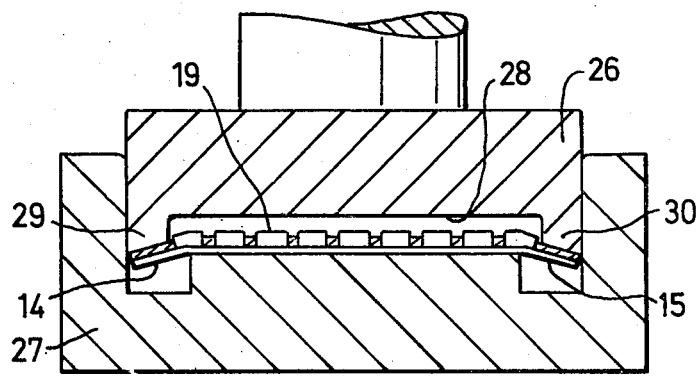

Referring to FIGS. 11, 12 and 13, the preferred way of manufacturing the blade illustrated in FIG. 1 in combination with FIG. 3 is to use two dies 26 and 27 as shown. The upper die 26 has a longitudinal, middle portion 28 of its lower face which never comes into contact with the cutting teeth 11 of the blade 10, which at this time is unhardened. At both its longitudinal edges, the die 26 has downwardly extending portions 29 and 30 which, as shown in FIGS. 12 and 13, engage the side edge portions 14 and 15 of the blade 10 as shown in FIG. 12, upon downward movement of the die 26 to the position shown in FIG. 13, to bend the side edge portions 14 and 15 of blade 10 back, relative to cutting face 12, from the substantially flat middle portion 17. At the same time as bending back the side edge portions 14 and 15 of blade 10, the dies 26 and 27 operate to cut the blade 10 from coil (not shown).

In the case where the blade has edge teeth, as at 15 in FIG. 1, it is an advantage of the blade 10 that the edge teeth at 15, which are not very efficient at cutting, are held out of contact from the workpiece until the middle portion 17 has sunk in the workpiece to a certain depth.

The method steps illustrated in FIGS. 8, 9 and 10 are all performed prior to heat hardening (not illustrated) of the blade 10.

I claim:

1. An elongate substantially rectangular abrading tool blade formed of sheet metal and having a multiplicity of cutting teeth distributed over a cutting face of the blade and a multiplicity of associated through-the-blade apertures, the cutting teeth and associated apertures extending in several parallel rows across the blade at an angle other than perpendicular to the longitudinal axis of the blade, with several cutting teeth and associated apertures in each row, all the said cutting teeth facing in a common single direction which is perpendicular to the said rows, each said aperture being directly in front of and adjacent its associated cutting tooth relative to said common single direction, two longitudinal side edge portions of the blade being bent back through an acute angle relative to the cutting face from a longitudinal, substantially flat, middle portion of the blade, the rows of cutting teeth and apertures extending across the full width of the middle portion of the blade and at least to the boundaries of said middle portion with the side edge portions, terminating short of both outside edges of the blade.

2. A blade as claimed in claim 1 wherein one of said longitudinal side edge portions comprises edge teeth.

3. A blade as claimed in claim 1 wherein one of said longitudinal side edge portions is smooth, devoid of edge teeth.

4. A blade as claimed in claim 2, wherein the other one of said longitudinal side edge portions is smooth, devoid of edge teeth.

5. In a method of making an elongate substantially rectangular abrading tool blade formed of sheet metal and having a multiplicity of cutting teeth distributed over a cutting face of the blade and a multiplicity of associated through-the-blade apertures, the cutting teeth and associated apertures extending in several parallel rows across the blade at an angle other than perpendicular to the longitudinal axis of the blade, with several cutting teeth and associated apertures in each row, all the said cutting teeth facing in a common single direction which is perpendicular to the said rows, each said aperture being directly in front of and adjacent its associated cutting tooth relative to said common single direction, the steps of bending two longitudinal side edge portions of the blade back through an acute angle relative to the cutting face from a longitudinal, substantially flat, middle portion of the blade, the rows of cutting teeth and apertures extending across the full width of the middle portion of the blade and at least to the boundaries of said middle portion with the side edge portions, terminating short of both outside edges of the blade.

6. A method as claimed in claim 5 wherein the bending back of said longitudinal side edge portions is effected by means of a pair of dies caused to close together and also at the same time to cut the blade from coil.

* * * * *